June 6, 1961    J. D. SYLVESTER ET AL    2,987,107
ROTARY HEAT-SEALING APPARATUS
Filed Feb. 27, 1959
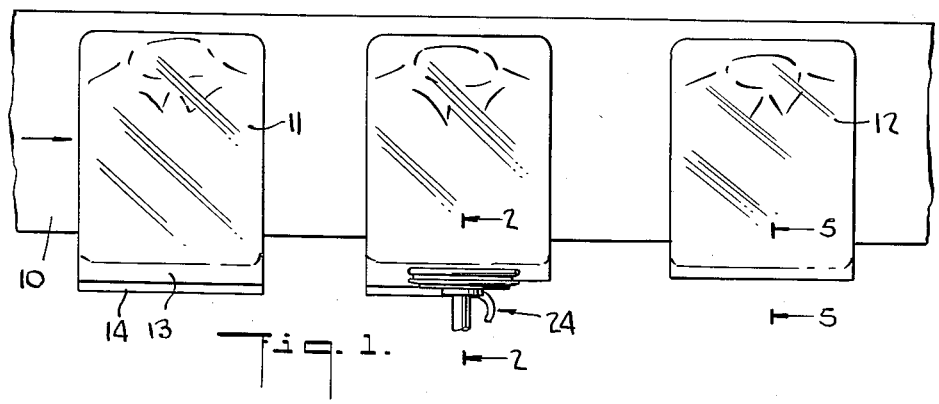
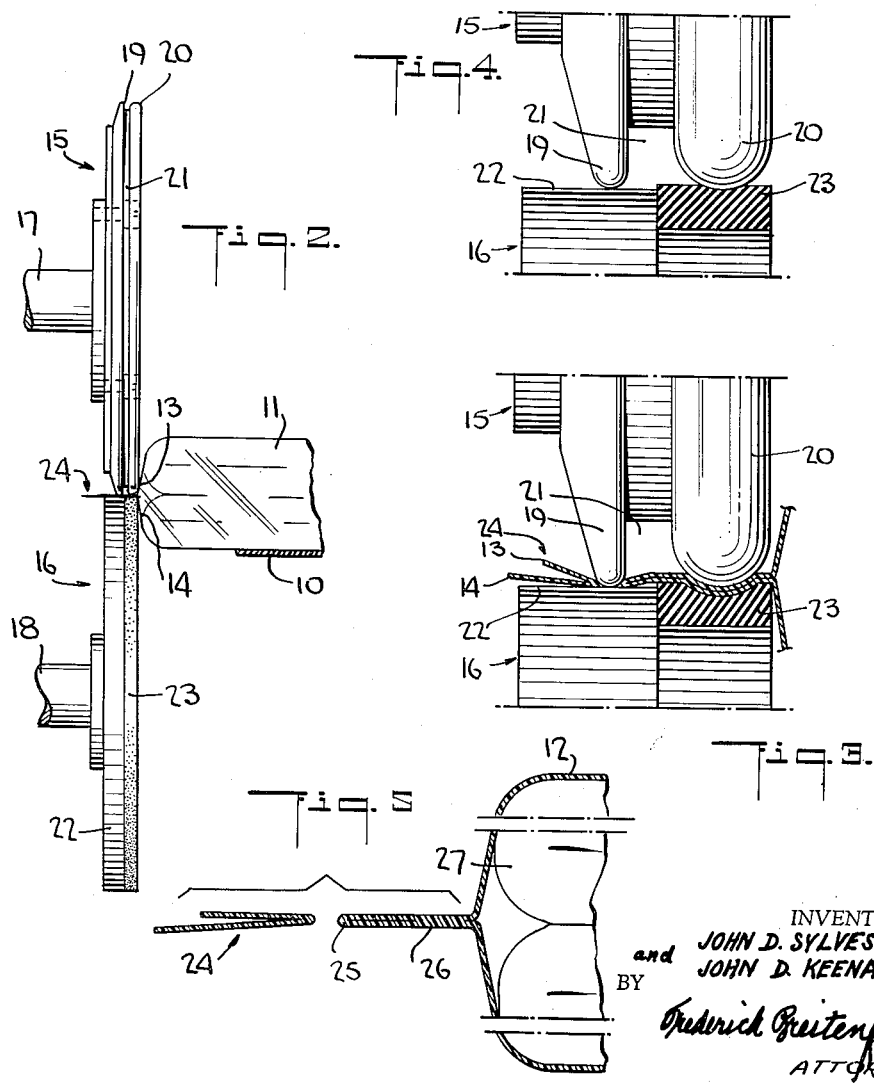
INVENTORS:
JOHN D. SYLVESTER
and JOHN D. KEENAN JR.
BY Frederick Breitenfeld
ATTORNEY

United States Patent Office 2,987,107
Patented June 6, 1961

2,987,107
ROTARY HEAT-SEALING APPARATUS
John D. Sylvester, Garden City, N.Y., and John D. Keenan, Jr., Caldwell, N.J., assignors to Amsco Packaging Machinery, Inc., Long Island City, N.Y., a corporation of New York
Filed Feb. 27, 1959, Ser. No. 796,030
2 Claims. (Cl. 154—42)

This invention relates generally to heat-sealing machines, and has particular reference to the type of machine which employs a pair of tangentially arranged rollers for sealing the mouths of plastic bags.

Bags composed of heat-sealable material such as polyethylene are commonly filled with merchandise and then fed to a conveyor or other means for moving them successively to and past a pair of heat-sealing rollers which pinch together the walls of each bag mouth to seal the bag. It is desirable in many cases to form a seal along a line which serves at the same time to define the edge of the sealed bag. Such a seal is usually referred to as an "edge-seal." It is also desirable that the seal lie as close as possible to the merchandise within the bag. It is a general object of this invention to provide an improved rotary sealing apparatus by means of which these results can be achieved both simply and reliably.

An edge-seal is usually formed by subjecting the walls of plastic material to a heated squeeze along a thin line, which makes it feasible simultaneously or immediately thereafter to sever and remove the excess material lying beyond the seal line. Because of the narrow nature of the resultant fused area, an undesirable strain is placed upon it when the seal is formed closely adjacent to the bag contents. The improvements proposed by the present invention make it possible to avoid this disadvantage without sacrificing the attractiveness and other benefits of an edge-seal, and without necessitating costly or expensive modifications of existing apparatus.

The invention is predicated upon the discovery that the simultaneous formation of an edge-seal along a thin line of fusion, and of a wider seal spaced slightly inward from the edge-seal, creates a reliable and staunch closure which can be expeditiously achieved by a single pair of heat-sealing rollers. It has been found practical and effective for the purpose to provide peripheral contours on the rollers which cause them to contact each other along a relatively thin line and along a wider line spaced therefrom. This may be achieved for each seal line by forming a ridge on one of the rollers and a relatively flat opposing surface on the other roller. Preferably the contacts are established by forming a pair of ridges, separated by a trough, on one of the rollers, which may be heated, and forming the periphery of the other roller to present the relatively flat opposing surfaces.

In accordance with this invention, one of the ridges referred to is relatively attenuated, and the surface it cooperates with is hard and anvil-like. This produces a thin line of fusion on the walls of the bag mouth from which the excess area lying beyond the seal may be readily torn or blown away. The other ridge is wider, and the surface it cooperates with is relatively yielding. As the bag plies pass between this region of contact a ribbon-like area is fused together.

In practicing the invention, the total sealed area of the bag mouth including both the thin edge-seal and the wider seal, may be no more than a small fraction of an inch in width, and the existence of two separated lines of fusion is imperceptible. Nevertheless the conjoint effect is one of unusual strength and stability, and at the same time the desirable appearance of an edge-seal, lying close against the enclosed merchandise, is created.

A preferred way of obtaining these objectives and advantages, and such other advantages as may hereinafter be pointed out, is illustrated in the accompanying drawings, in which—

FIGURE 1 is a schematic plan view of the rollers of a sealing machine of the character referred to, embodying the features of the invention and showing how a succession of bags are moved to and past the rollers;

FIGURE 2 is an enlarged cross-section along the line 2—2 of FIGURE 1;

FIGURE 3 is a fragmentary view, in further enlargement, of the active areas of the rollers shown in FIGURE 2, the bag mouth and one of the rollers being shown in cross-section;

FIGURE 4 is a view similar to FIGURE 3, showing the rollers in contact without the interposed bag mouth walls; and FIGURE 5 is a cross-sectional view along the line 5—5 of FIGURE 1, on a greatly enlarged scale.

A conveyor 10 of suitable character is adapted to support a succession of filled plastic bags, such as that indicated at 11, and to move them to and past a sealing station at which the bag mouths are sealed. The sealed merchandise packages, such as that indicated at 12, are carried by the conveyor 10 to a discharge location.

The bag mouth consists of two superposed plies 13 and 14. To facilitate the loading operation, one of these walls is usually slightly longer than the other. At the sealing station, these bag mouth walls pass between a pair of rollers 15 and 16 arranged in tangential relationship and rotating in opposite directions upon supporting shafts 17 and 18 respectively (see FIGURE 2). These rollers form part of a rotary sealing apparatus of known character (not shown), provided with suitable driving means for the rollers, as well as electrical means for heating at least one of the rollers.

In the construction illustrated, the roller 15 is the heated roller, and its periphery is contoured to define a pair of ridges 19 and 20 separated by a groove or trough 21. The ridge 19 is relatively attenuated, and the ridge 20 is wider and more gently rounded. The periphery of the roller 16 is contoured to provide relatively flat opposing surfaces. The surface 22 which cooperates with the attenuated ridge 19 is composed of a material which is hard and unyielding. This provides an anvil-like surface against which the attenuated ridge 19 is effective to squeeze the plies of plastic material passing between the rollers, as best indicated in FIGURE 3. The surface 23 opposed to the wider ridge 20 is of yieldable material such as rubber or its equivalent. In its normal state this surface projects slightly beyond the surface 22, as indicated in FIGURE 4. In this way a relatively broad contact area is assured, and when the plies of material pass between the rollers in this region a relatively wide fused area is bonded together, as indicated in FIGURE 3.

As the bag mouth passes between the rollers, or immediately thereafter, the excess material indicated at 24 is removed. This may be accomplished by a blowing action performed by a suitable blast of air directed by a properly positioned nozzle (not shown). The result is the formation of an edge-seal 25 on the finished package, this seal being formed by a relatively thin line of fusion. Upon reference to FIGURE 5 it will be noticed that this line of fusion is slightly spaced from the wider fused area 26 created by the cooperative action of the ridge 20 and the surface 23.

By the interposition of an appropriate heat-shielding wire or element (not shown) the sealing action of the rollers may be caused to take place closely adjacent to the contents 27 of the bags. This produces a neat merchandise package. As a result of the dual seal produced by this apparatus, the bag mouth is securely and reliably sealed and remains so without any likelihood of reopening under strain. The invention is not restricted to any specific dimensions, but to explain its advantages more effectively than the drawings alone may serve to do, it should be noted that the width of the wider roller ridge 20 may be as small as 3/16 of an inch; the width of the groove or trough 21 may be as small as 3/32 of an inch; and the radius of curvature of the ridge 19 may be as little as 1/32 of an inch. The total sealed area comprising the parallel fused areas 25, 26 is little more than 1/4 of an inch. Each of the wheels may have a diameter of approximately six inches.

The invention is not necessarily restricted to the sealing of bag mouths, and may obviously be employed for analogous purposes. The apparatus has proven highly effective, however, in sealing the mouths of merchandise packages in which dry goods or similar articles of merchandise have been accommodated in polyethylene bags of relatively thin wall thickness.

In general, it will be understood that many of the details herein described and illustrated, including the dimensions and proportions and purposes given by way of illustration, may be modified in various respects by those skilled in the art without necessarily departing from the spirit and scope of the invention as expressed in the appended claims.

What is claimed is:

1. In a machine for sealing the mouth of a plastic bag, including a pair of tangentially arranged heat-sealing rollers and means for moving the bag to and past said rollers so as to pinch the walls of the bag mouth between them: roller peripheries contoured so as to contact the bag along a relatively thin line and along a wider line spaced therefrom, but so as to remain out of contact with the bag between said lines, said thin-line contact being adapted to form an edge-seal on the bag, the other a wider seal spaced slightly inward from the edge-seal, said wider line of contact being established by a smooth ridge on the periphery of one of said rollers and a relatively flat yieldable opposing surface on the periphery of the other roller.

2. In a machine for sealing the mouth of a plastic bag, including a pair of tangentially arranged heat-sealing rollers and means for moving the bag to and past said rollers so as to pinch the walls of the bag mouth between them: roller peripheries contoured so as to contact the bag along a relatively thin line and along a wider line spaced therefrom, but so as to remain out of contact with the bag between said lines, said thin-line contact being adapted to form an edge-seal on the bag, the other a wider seal spaced slightly inward from the edge-seal, said lines of contact being established by a pair of smooth spaced ridges formed on the periphery of one of said rollers, the diameters of said ridges being equal, one ridge being attenuated and the other not, and relatively flat opposing surfaces on the periphery of the other roller, the surface opposing the attenuated ridge being relatively hard and unyielding, the other opposing surface being of yieldable nature.

References Cited in the file of this patent

UNITED STATES PATENTS

| | | |
|---|---|---|
| 1,869,550 | Dorogi | Aug. 2, 1932 |
| 2,117,452 | Robinson | May 17, 1938 |
| 2,579,063 | Andrews | Dec. 18, 1951 |
| 2,743,761 | Snyder | May 1, 1956 |